United States Patent [19]

Rische et al.

[11] Patent Number: 5,278,382
[45] Date of Patent: Jan. 11, 1994

[54] METHOD FOR THE HIGH-FREQUENCY HEATING OF DIELECTRIC WORKPIECES

[75] Inventors: Uwe W. Rische, Hamburg; Detlev Böl, Kaltenkirchen; Horst Zengel, Wedel, all of Fed. Rep. of Germany

[73] Assignee: Herfurth GmbH, Hamburg, Fed. Rep. of Germany

[21] Appl. No.: 784,492

[22] Filed: Oct. 29, 1991

[30] Foreign Application Priority Data

Oct. 29, 1990 [DE] Fed. Rep. of Germany ....... 4034367

[51] Int. Cl.$^5$ ............................ H05B 6/60; H05B 6/50
[52] U.S. Cl. ................................... 219/779; 219/61.2; 219/110; 219/765
[58] Field of Search ............... 219/10.81, 8.5, 9.5, 219/10.41, 10.53, 10.47, 10.75, 10.77, 61.2, 61.5, 109, 110, 121.47

[56] References Cited

U.S. PATENT DOCUMENTS

| | | | |
|---|---|---|---|
| 2,540,613 | 2/1951 | Foley et al. | 219/10.75 |
| 3,118,999 | 1/1964 | Dreyer | 219/10.75 |
| 4,221,950 | 9/1980 | Lamberts et al. | 219/10.81 |
| 4,254,323 | 3/1981 | Takamatsu et al. | 219/8.5 |
| 4,307,276 | 12/1981 | Kurata et al. | 219/10.41 |
| 4,420,670 | 12/1983 | Croswell et al. | 219/10.81 |
| 4,531,038 | 7/1985 | Lillibridge et al. | 219/10.81 |
| 4,621,176 | 11/1986 | Kliesch et al. | 219/8.5 |
| 4,740,665 | 4/1988 | Sanmiya et al. | 219/61.2 |

FOREIGN PATENT DOCUMENTS

| | | |
|---|---|---|
| 0019747 | 12/1980 | European Pat. Off. |
| 858870 | 12/1952 | Fed. Rep. of Germany |
| 922382 | 6/1947 | France |

Primary Examiner—Bruce A. Reynolds
Assistant Examiner—Tu Hoang
Attorney, Agent, or Firm—Townsend and Townsend Khourie and Crew

[57] ABSTRACT

A method for the heating and joining together, preferably for welding, of workpieces by use of a generator. Where, during a heating interval the generator supplies high-frequency energy to at least two electrodes disposed on the workpiece and where the energy supply is controlled by a predetermined time-related curve, with respect to a target value. Accordingly, the energy supply is controlled with reference to the target value by monitoring a first parameter, e.g., high-frequency voltage, high-frequency current or generator anode current. Also, during the heating interval at least one further parameter is monitored, and in the event of an inadmissible divergence in the control system of the first parameter, a subsequent control of the energy supply is carried out.

37 Claims, 3 Drawing Sheets

METHOD FOR THE HIGH-FREQUENCY HEATING OF DIELECTRIC WORKPIECES

BACKGROUND OF THE INVENTION

The present invention takes as its starting point a method for the heating and joining together, more particularly for the welding together, of workpieces by using a generator. During a heating interval, the generator supplies high-frequency energy to at least two electrodes disposed on the workpiece, the energy supply being controlled with respect to a target value by means of a predetermined time-related curve.

Such a method is known from German Patent DE-PS 858 870. There, high-frequency energy is supplied from a generator via an adjustable capacitive impedance to the electrodes on a workpiece and the high-frequency voltage at the electrodes is monitored. When it diverges from a target value, the capacitive impedance is altered with the aid of a motor and a regulation to the target value is thus effected.

During the welding operation the characteristics of the workpieces disposed between the electrodes will generally be altered. Certain zones change their properties or characteristics during the resulting temperature increase, those changes will alter the high-frequency energy absorption. It is also possible for workpieces to change position due to the contact pressure of the electrodes and, thereby, absorb a larger or smaller volume of high-frequency energy. Individual workpieces may exhibit variable welding behavior. It is thus possible that an electric breakdown may take place, or that the material may be inadequately heated and that a poor joining and connection of the workpieces may result. This may occur even when the high-frequency voltage is controlled in accordance with a predetermined time-related curve.

Furthermore, on account of varying material compositions in the joining zone, one frequently moves within the boundaries of a safe manufacturing progress. Due to varying degrees of humidity, uneven weight per unit area or inhomogeneous resin distribution, high-frequency breakdowns readily occur.

Such high-frequency breakdowns also occur in the case of a critical course of the joining zones in contiguous workpieces, e.g., in the door trim or instrument board of a motor vehicle. Reclaimed material possessing unintentional but noticeable differences in physical properties may sometimes be used for workpieces, e.g., for the carpet linings of the underbodies of motor vehicles. High frequency breakdowns are especially common when pieces that have differing physical properties are joined. For example, if a carpet covering and an anti-slip cover are welded together, the carpet covering is particularly susceptible to breakdown and may possibly show damage caused by fire.

Similar susceptibilities to welding treatment result consequent to other factors, such as the application of an adhesive, the type of adhesive if applied, the type of textile, or the treatment of the textiles in question, etc. These susceptibilities may also give rise to problems in the joining process.

Certain applications for vehicle assembly have been set forth above. Additional areas of application exist in vehicle assembly, such as the covering of electric components of the instrument board. These components are mainly fabricated from ABS (alkylbenzole sulfonate) and, in part, are joined together with the aid of a high-frequency joining process. These molded parts may possess varying wall thicknesses within the joining zone. In this context as well, it is of prime importance that work is carried out below the high-frequency breakdown limit.

Another area which may be considered for high-frequency heating is the manufacture of visors. In this context, an extraordinarily high degree of accuracy in the power control must be employed. Similarly, in the fabrication of theft-proof packaging (produced from molded, hard PVC) the joining zones have varying material thickness, which can readily result in production of flawed joints. Furthermore, this method, involving the use of high-frequency heating, is particularly advantageous for the drying, gluing, sterilizing, etc. of workpieces.

It is the object of the present invention to develop a method such that the ideal parameters for a secure joining together of the workpieces are adhered to; the adherence to ideal parameters effected with sufficient accuracy so that flawless products can be manufactured despite critical limitations values of the materials. Accordingly, the part rejection rate can be drastically reduced.

SUMMARY OF THE INVENTION

The myriad technical problems of the background art are solved according to the invention in that, independently of a first parameter (such as, high-frequency voltage, high-frequency current, or generator anode current) the supply of energy is controlled with respect to a target value curve. The energy supply is controlled such that during the heating interval, at least one further parameter is monitored and, in the event of an unacceptable divergence taking place, a subsequent counteracting control of the energy supply is effected within the control system of the first parameter.

It is possible to experimentally determine and establish the target curve for the first parameter. However, on account of properties that will often differ from workpiece to workpiece, it is not possible to ensure that in each case an unacceptable overload does not occur. Examples of such unacceptable overloads include excessive heating, or an increase in the ultra high-frequency voltage up to the danger of a breakdown. Due to these overloads the quality of the ultimately obtained, welded workpiece could be impaired. Now, by monitoring a further parameter, it is possible to prevent a breakdown in the ultra high-frequency from taking place. Due to this advantageous effect it is now possible to adhere to closer tolerances, so that an acceleration of production may also be achieved.

The further parameter, being used to control the energy supply of the first parameter, can be monitored by at least one tolerance limiting curve, and when this limiting curve is exceeded, a correction signal can be formed. The correction signal can be supplied to the control system of the first parameter so that the energy supplied can be restricted when the danger of exceeding the tolerance range exists. An admissible standard curve can be determined experimentally, then at least one tolerance limiting curve can then proceed at a certain distance from this standard curve. This distance may differ from approximately 5% to approximately 15%, from the mean value of the standard curve, but preferably, by approximately 10%.

The correction value can be formed when the further parameter diverges from the standard curve by more than a specific value (for example, approximately 70%) of the distance between the standard curve and the tolerance limiting curve. In such a case, no influencing is effected when smaller divergences are involved, and only in the event that the further parameter exhibits larger divergences, and more closely approaches the tolerance limiting curve, will a counter-control of the energy supply be commenced.

The correction value may be dependent on the steepness of the approach to the tolerance limiting curve. Thus, it is possible to ensure that in the event of a very rapid divergence from the standard curve, when danger appears to be imminent, a corresponding quick and effective correction occurs. Thereby, a dangerous overloading, such as overheating or high-frequency breakdown may be prevented.

The energy supply, and the concomitant heating process, will advantageously be entirely stopped when the tolerance limiting curve is exceeded, and/or when the steepness of the approach to the tolerance limiting curve exceeds a specific value. It is thus possible to interrupt operation just before the workpiece is jeopardized. The workpiece can then be subsequently processed outside the normal production time; thereby, a properly fabricated workpiece can still be achieved. For this purpose it may be expedient to register and/or indicate the time that has elapsed during the first heating process, up to the time the energy supply was switched off, so that when the workpiece is subsequently processed it will be possible to estimate the reheating that is still required.

It is also possible to monitor the further parameter by means of internal and external tolerance limiting curves. In this context the correction signal for a counter-control of the energy supply is formed when the internal tolerance limiting curve is exceeded, and the energy supply is cut off completely when the external tolerance limiting curve is exceeded.

Counter-control of the energy supply can be carried out by changing the anode current of a high-frequency generator tube, or by changing an inductive or capacitive coupling between the generator and the electrodes. Counter-control of the energy supply can also be effected by means of a, possibly subsequently controllable, reactive impedance connected to at least one electrode. It is possible hereby to change the adaptation between the electrodes and the generator and to control the transmission of effective power. Counter-control via a lower energy supply can also be effected by a brief and more substantial reduction of the energy supply, e.g., by switching off the generator output. Likewise, a higher energy output is possible by means of a brief distinct increase, e.g., to the 1.3-fold, in the generator output. In this case, no provision needs to be made for elements that continuously control of the power transmission, rather the energy supply can be changed by pulse control.

DETAILED DESCRIPTION OF THE PREFERRED EMBODIMENT

Figure 1:
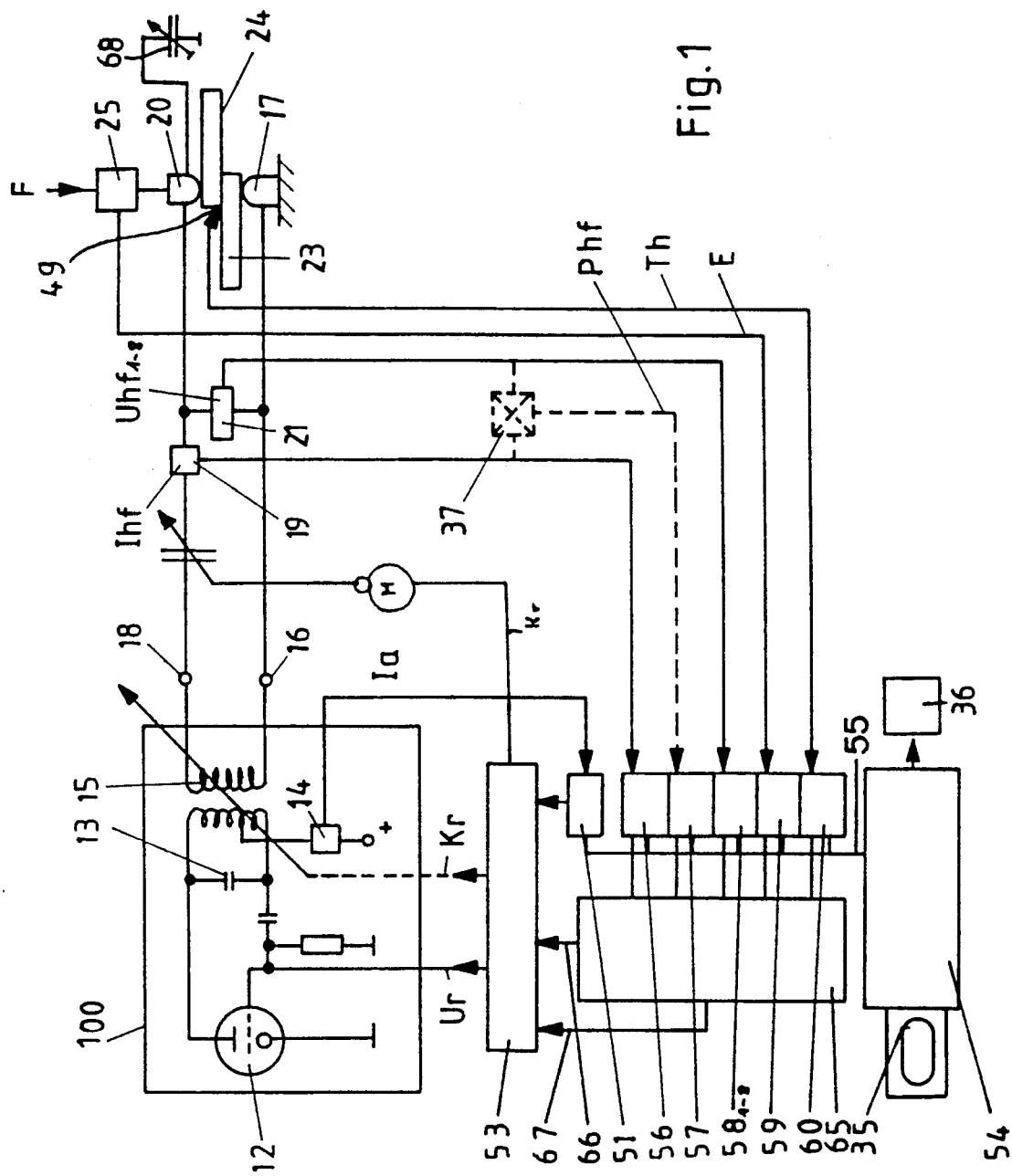
FIG. 1 illustrates a device having a circuit arrangement for a method according to the invention.

In FIG. 1, 100 identifies a high-frequency generator with a power tube 12 having a grounded cathode, and between whose grid and anode, a resonant circuit 13 is disposed; with which the requisite feedback is simultaneously effected in that a tapping point of the resonant circuit 13 is connected to the positive supply. A first measured value transducer 14 is disposed in the branch to the positive value transducer which supplies a measured value signal Ia corresponding to the anode current. A voltage Ur is supplied to the grid of the tube 12 from a control signal stage 53, with the aid of which it is possible to effect a control of anode current of the tube 12. An output coil 15 is coupled to the resonant circuit 13. One end 16 of the output coil is connected to a ground and a first electrode 17, and the other end 18 of the output coil is connected to a second electrode 20 via a second measured value transducer 19. The second measured value transducer 19 supplies a second measured value signal Ihf which is proportionate to the supplied high-frequency current. Between the first electrode 17 and the second electrode 20, further measured value transducers 21 are connected. Additionally, a third measured value signal Uhf is supplied by measured value transducers. The measured value signal Uhf in each case corresponds to the high-frequency voltage Uhf 1-8 supplied to the electrodes 17 and 20 at the point of connection.

The three measured value signals Ia, Ihf, and Uhf are fed as parameters to comparator stages 51, 56 and 58, respectively.

Electrodes 17 and 20, are supplied with high-frequency voltage; two dielectric workpiece portions 23 and 24 are disposed in an overlapping manner between the two electrodes. In order to join the two workpieces together, high-frequency energy can be supplied from the generator 100. The joining of these pieces can be by welding or bonding. As depicted in FIG. 1, workpieces 23 and 24 are pressed together via the electrodes 17 and 20 by means of a force F. Force F may change with time during the heating interval, this changing value can be controlled from without. During the heating process certain portions of the workpiece material become softened. Accordingly, workpiece portions 23 and 24 become pliable and a certain sinking-in depth results; this depth can be measured with the aid of a fourth measured value, signal E.

It is possible furthermore for a temperature sensor 49 to be disposed in the proximity of the heating zone, sensor 49 supplies a fifth measured value signal Th, which corresponds to the temperature. Temperature measuring element 49 can be effected by means of a converter unit that absorbs infrared heat radiation and relays the signal.

Figure 2:
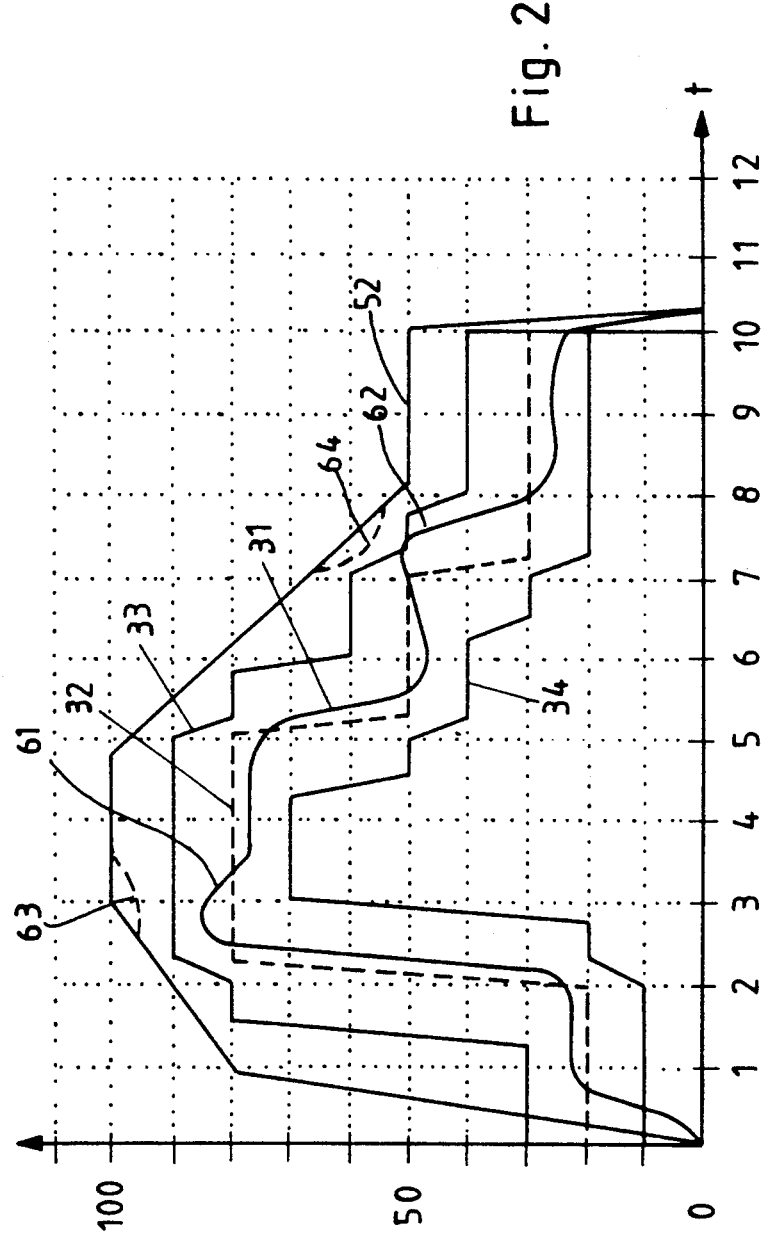
FIG. 2 shows the effective curves in a circuit diagram according to FIG. 1.

Measured value Ia from the first measured value transducer 14, is supplied to comparator stage 51. Comparator stage 51 stores a target value curve 52. FIG. 2 depicts a target value curve 52 for a heating interval lasting approximately 10 seconds. Measured value Ia is compared with this target value curve 52, and the difference is supplied to a control signal stage 53. Coupling value Kr is set by the control signal stage 53. Thereafter, e.g., by a motor-operated adjustment, transmission of energy from the generator 100 to electrodes 17, 20 is altered in accordance with a desired target value curve. It is also possible to form a grid control voltage Ur. With the aid of control voltage Ur, generator tube 12 is controlled such that, during the heating interval, its anode current follows target value curve 52. Additionally, a target value curve 52 can be input into the comparator stage 51 from a control unit 54, via an input line 55.

The further measured values: Ihf for the high-frequency current, Uhf 1–8 for the high-frequency voltage at electrodes 17 and 20, Th for the temperature monitored by sensor 49, E for the sinking-in depth, and optionally Phf for a measured value of the high-frequency power obtained in a multiplier 37, are supplied to further comparator stages 56, 58, 60, 59 and 57, respectively.

As depicted in FIG. 2. a standard curve 32 (shown by dotted lines) is input into comparator stage 56, along with tolerance limiting curves 33 and 34, above and below this curve respectively. Measured value Uhf 1–8 input into comparator stage 58 may, as depicted in FIG. 2, during the heating period exhibit a course according to curve 31. If this course corresponds to the standard curve 32, interference with the energy supply from the oscillator 100 is not necessary. However, if the measured value curve 31 shows a more significant divergence from the standard curve 32, as depicted at 61 or at 62, a return control by altering the generator output is expedient. When return control occurs, indicated at 63 and 64 by means of dashed curved sections, bulges 61 and 62 would recede and undesirable overheating in workpieces 23 and 24 is avoided. Divergences from standard curve 32 (indicated at 61 and 62) are supplied by comparator stage 56 to correction signal stage 65. Signal stage 65 triggers control signal stage 53 via an output 66, along the lines described.

Again referring to FIG. 2, if measured value curve 31 of the parameter Uhf 1–8 exhibits an even more substantial divergence, possibly exceeding upper tolerance limiting curve 33, correction signal stage 65 can supply a switching-off signal to the stage 53 via line 67. Thus, the entire heating process can be terminated immediately.

As described above, at least one of the further parameters, via their prospective comparator stages 56, 57, 58, 59 and/or 60, may effectively monitor with respect to an assigned standard curve. This monitoring being effected via comparator stage 65. The standard curve can be input from control unit 54, via line 55. Also, if desired, the standard value curve can be changed.

Control of the output supplied from generator 100 to electrodes 17 and 20 can be effected by a change in the coupling between output coil 15 and electrode 20 with the aid of the signal Kr. Signal Kr may, for instance, control the generator by a motor-operated adjustment. One of the elements transmitting the energy may be modified in the motor-operated adjustment so that a different adaptation results. In accordance with the present invention, it is possible to connect a reactive impedance, e.g., a condenser 68, to electrode 20 and to adjust the same for changing the energy absorption independent of signal Kr.

The irregular course of the curve 31, apparent in FIG. 2 occurs because the conductivity of the material between electrodes 17 and 20 is not constant. Rather, during the supplying of high-frequency energy and heating of the material, the conductivity of the material is altered. As previously discussed, by means of the control signal stage it is possible to counteract a change in conductivity which would jeopardize the workpiece.

The target value curve 52 can be determined experimentally. Thereafter, curve 52 can, by control unit 54, be input into comparator stages in question. For example, a target curve 52 can be input into comparator stage 51, via points at intervals of 0.25 seconds. Thereby, during the welding operation a check by means of a comparator stage is effected.

An exact coincidence of curve 31 with standard value curve 32 is not necessary. (Were exact coincidence attempted considerable difficulties could arise in practical operation.) Rather, the above-described invention makes it possible to control the heating process so that a good result is obtained. Pursuant to the present invention, by monitoring of at least one further parameter, it is possible to operate with a relatively high power while having a narrow tolerance range. The method of the present invention allows for more rapid production utilizing shorter heating intervals. Shorter heating intervals lead to reduced heating of the surroundings. In particular, less heating of a supporting plate (or any similar structure necessary for positioning workpiece portions 23 and 24) is achieved. Accordingly, it will not be necessary to cool the workpiece positioning structure for extended periods before a subsequent manufacturing procedure takes place. The method of the present invention results in safe welds, reduces the time required for cooling, and shortens the output phase of the production.

The actual values of a curve received during the heating interval can be transmitted to a storage unit connected to control unit 54. The actual value curves of a plurality of heating processors can then be reproduced, on a monitor 35 and/or on a printer 36. Thereby, it is possible to evaluate fluctuations that take place in actual production, and to determine what corrections may be effected to expedite production still further.

If, because a tolerance limit has been exceeded, the heating process has been discontinued during the production of a workpiece joint, the time period that heating had already been applied may be recorded and indicated. Thus, it is possible to estimate the duration of treatment that is still required in order to finish the workpiece in question. Since discontinuance of the heating process is effected before any permanent damage has been caused, it is possible to almost entirely avoid rejects.

Additionally, control by lessening the energy supply can occur by a brief but more significant reduction, e.g., discontinuation of generator output. For this purpose, grid control voltage Ur may temporarily be brought to a value that blocks tube 12. In an analogous manner, control for a higher energy supply may occur by means of a brief, distinct increase in generator output. For example, generator output may be increased to 1 to 3 fold by having the grid control voltage be briefly gated to a higher power value.

Additionally, parameter E may be used for monitoring. Parameter E proceeds from transducer 25, and reflects increased sinking-in depth. At a certain stage increased sinking-in indicates overheating and that the material is becoming too soft. When the material becomes too soft a high-frequency voltage breakdown may be imminent.

The parameters measured during a welding operation, irrespective of whether they are used for controlling or monitoring purposes, can be stored, with the aid of the control unit 54. Thus, information for a multitude of workpieces of the same or different types can be represented on monitor 35 as desired. This information can be represented individually or severally. Preferably the information is presented with a standard value curve together with its corresponding tolerance curve. To enhance evaluation, representations of the mean values of previously recorded curves may be placed on paper with the aid of a printer. By means of these representations it is further possible to obtain optimal adjustment. A larger amount of data can be recorded on an interchangeable storage medium possessing great storage capacity, such as a computer hard disk or a diskette. Thus, production can be continually monitored by a target value curve 52 or a standard value curve 32.

As a further embodiment of the present invention, two devices which perform the method of the invention will be connected to a generator. It is then possible to alternately employ them for heating. Accordingly, processed workpieces can be removed and fresh workpieces can be inserted during the interval that the other device is being activated.

The target value curve, and optionally tolerance limiting curves, may be input into a computer, point for point, e.g., at intervals of 0.25 seconds. The computer then produces a closed curve by connecting the points. It is also possible to input individual curves for alternately operated devices, so that different workpieces can be alternately processed.

The target value curve can be produced in an advantageously simple manner, a specific curve based on previous experience is initially input, thereafter a heating process is then carried out, the parameter values of which are recorded and stored. The treated workpiece can then be checked and, if necessary, the target value curve can be corrected to achieve the more optimal manufacturing result.

Generally, measuring sensors supply parameters in the form of analog signals. To enhance the result of further processing, outputs from measuring sensors or from the correction signal stage 65 can be converted into digital signals.

In addition to monitoring for any exceeding of a tolerance limiting value curve, it is also possible to check and to signal when a control value supplied to the generator reaches its maximum value and further control cannot be achieved. Pursuant to this signal, the heating process will be modified according to the target value curve in a suitable manner. If control of the generator is effected manually, independent of the time, the actual value is simultaneously received and recorded by the comparator, facilitating thereby the determination of the most favorable target value.

With the method according to the present invention, the ideal parameters for safe production can be determined in a simple manner and adhered to exactly. In particular, it is possible by controlling the anode current Ia or the high-frequency voltage Uhf, to safely stay within critical material values during manufacture. Were the reject rate to rise, the error source may be determined by evaluating the recorded parameter and associated graphic representations thereof. Further, using the present invention to control the parameters it is possible to safely process materials that vary in quality.

Also, it will be possible, for example, to dry, bond, sterilize, or temper, workpieces, while adhering to optimal conditions with a very high degree of precision.

Figure 3:
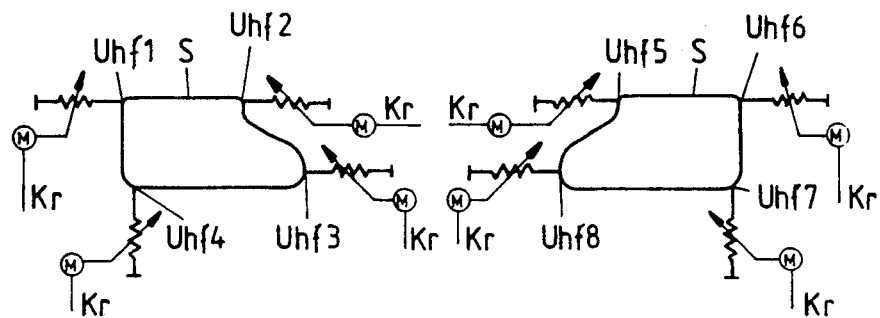
FIG. 3 shows a base electrode with measured value transducers coupled thereto and adjustable inductivities.
Figure 4:
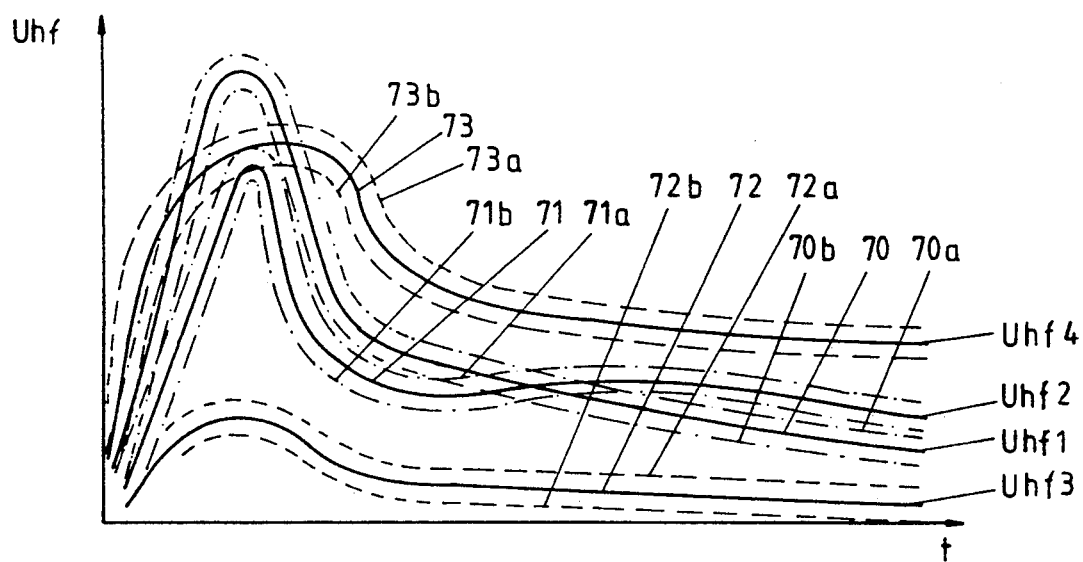
FIG. 4 shows sample standard curves and tolerance curves provided for an arrangement according to FIG. 3.

As depicted in FIGS. 3 and 4, when large workpieces are welded, Uhf 1-8 may be used as the parameter at quite specific points. If necessary, Uhf 1-8 is affected by appropriately connected inductivities or capacities. Tolerance limiting curves 70a, 70b; 71a, 71b; 72a, 72b; 73a, 73b can be established, as has been described above. By the control effected via Kr, the voltage distribution Uhf 1-4 or voltage distribution Uhf 5-8 is kept within its respective tolerances. Accordingly, the differences between the individual workpieces, such as varying degrees of humidity, as well as the differences that arise relative to the course S of the welding points, can be equalized in such a way that no more flawed points occur.

What is claimed is:

1. A method for heating and joining together of workpieces with a high-frequency generator which, during a heating interval, supplies a high-frequency output to at least two electrodes disposed on the workpiece, the high-frequency output being controlled with respect to a series of target values, the method comprising the steps of:
    controlling the high-frequency output with reference to the series of target values that are dependent on a first parameter;
    measuring a series of further parameter values during the heating interval; and
    effecting counteracting control of the high-frequency output responsive to the series of further parameter values supplied to a control circuit of the high frequency generator to adjust the first parameter away from the series of target values.

2. The method of claim 1 wherein the controlling step is carried out using high-frequency voltage as the first parameter.

3. The method of claim 1 wherein the controlling step is carried out using high-frequency current as the first parameter.

4. The method of claim 1 wherein the controlling step is carried out using generator anode current as the first parameter.

5. The method of claim 1 wherein the measuring step is carried out using high-frequency current as a basis of the series of further parameter values.

6. The method of claim 1 wherein the measuring step is carried out using sinking-in depth, corresponding to a measure of the workpiece pliability and softness, as a basis of the series of further parameter values.

7. The method of claim 1 wherein the measuring step is carried out using temperature as a basis of the series of further parameter values.

8. The method of claim 1 wherein the measuring step is carried out using high-frequency voltage as a basis of the series of further parameter values.

9. The method according to claim 1, wherein the series of target values is input by hand.

10. The method of claim 1, wherein the further parameter is controlled by at least one tolerance limiting curve including a series of limiting values.

11. The method according to claim 10, wherein a correction signal is calculated when one of the series of further parameter values is within a predetermined proximity to one of the series of predetermined limiting values.

12. The method according to claim 10, wherein a correction signal is calculated when one of the series of further parameter values exceeds one of the series of predetermined limiting values.

13. The method according to claim 10, wherein a correction signal is calculated when one of the series of further parameter is proximate to and exceeds one the series of tolerance limiting values.

14. The method according to claim 10, wherein at least one series of predetermined limiting values is defined as a percentage of a series of standard values.

15. The method according to claim 14, wherein the correction signal is calculated when the series of standard values diverges by more than about 70% of a difference between the series of standard values and the series of predetermined limiting values.

16. The method according to claim 14, wherein the correction signal increases as the series of further parameter values approaches the series of predetermined limiting values.

17. The method according to claim 14, wherein the correction signal is dependent on a slope of a curve defined by the series of further parameter values as said series of further parameter values approaches the series of predetermined limiting values.

18. The method according to claim 14, wherein the high frequency generator is switched off when the series of predetermined limiting values is exceeded.

19. The method according to claim 17, wherein the high frequency generator is switched off when the slope of the curve defined by the series of further parameter values exceeds a predetermined value.

20. The method according to claim 1, wherein the series of further parameter values is measured with reference to a series of internal predetermined limiting values and a series of external predetermined limiting values, wherein said series of internal predetermined limiting values is defined as a percentage, less than 100 percent, of the series of standard values and said series of external predetermined limiting values is defined as a percentage, greater than 100 percent, of the series of standard values, and further wherein a correction signal is calculated when the series of internal predetermined limiting values is exceeded, and wherein the high frequency generator is switched off when the series of external predetermined limiting values is exceeded.

21. The method according to claim 18, wherein an indication is made of a time elapsed between initialization of the heating interval and the switching off of the high frequency generator.

22. The method according to claim 1, wherein the control circuit of the high-frequency generator, upon receiving a correction signal, effects the counteracting control.

23. The method according to claim 1, wherein the control circuit of the high-frequency generator effects the counteracting control by changing an anode current of a tube of the high-frequency generator.

24. The method according to claim 1, wherein the control circuit, upon receiving the correction signal, changes at least one of an inductive and an capacitive coupling between the high frequency generator and the electrodes.

25. The method according to claim 1, wherein the control circuit, upon receiving the correction signal, changes at least one reactive impedance connected to at least one electrode.

26. The method according to claim 1, wherein the control circuit, upon receiving the correction signal, temporarily switches off the output of the high frequency generator.

27. The method according to claim 1, wherein the control circuit, upon receiving the correction signal, temporarily increases the output of the high frequency generator.

28. The method according to claim 1, wherein more than one series of further parameter values are measured and a correction signal is calculated by combining the differences between each series of further parameter values and a series of predetermined limiting values for that parameter.

29. A method for heating and joining workpieces with a high-frequency generator that, during a heating interval, supplies a high-frequency output to at least two electrodes disposed on the workpieces, the high-frequency output being controlled with respect to a series of target values, the method comprising the steps of:
controlling the high-frequency output with reference to the series of target values that are dependent on a first parameter;
measuring a series of further parameter values during the heating interval;
comparing the series of further parameter values with a series of predetermined limiting values, wherein the predetermined limiting value is defined as a percentage of a series of standard values;
calculating a correction signal based on a difference between the series of further parameter values and the series of predetermined limiting values; and
effecting counteracting control of the high-frequency output by supplying the correction signal to a control circuit of the high frequency generator to adjust the first parameter away from the series of target values when the difference exceeds a predetermined value.

30. The method according to claim 29, wherein the correction signal is calculated when the series of standard values diverges by more than about 70% of a difference between the series of standard values and the series of predetermined limiting values.

31. The method according to claim 29, wherein the correction signal increases as the series of further parameter values approaches the series of predetermined limiting values.

32. The method according to claim 29, wherein the correction signal is dependent on a slope of a curve defined by the series of further parameter values as said series of further parameter values approaches the series of predetermined limiting values.

33. The method according to claim 29, wherein the high frequency generator is switched off when the series of predetermined limiting values is exceeded.

34. The method according to claim 32, wherein the high frequency generator is switched off when the slope of the curve defined by the series of further parameter values exceeds a predetermined value.

35. The method according to claim 31, wherein an indication is made of a time elapsed between initialization of the heating interval and the switching off of the high frequency generator.

36. A method for heating and joining together of workpieces with a high-frequency generator which, during a heating interval, supplies a high-frequency output to at least two electrodes disposed on the workpieces, the high-frequency output being controlled with respect to a series of target values, the method comprising the steps of:

controlling the high-frequency output with reference to the series of target values that are dependent on a first parameter;

measuring a series of further parameter values during the heating interval, wherein the series of further parameter values is measured with reference to a series of internal predetermined limiting values and a series of external predetermined limiting values, wherein said series of internal predetermined limiting values is defined as a percentage, less than 100 percent, of a series of standard values and said series of external predetermined limiting values is defined as a percentage, greater than 100 percent, of the series of standard values; and effecting counteracting control of the high-frequency output responsive to the series of further parameter values supplied to a control circuit of the high frequency generator when the series of internal predetermined limiting values is exceeded, and wherein the high frequency generator is switched off when the series of external predetermined limiting values is exceeded.

37. A method for heating and joining together of workpieces with a high-frequency generator which, during a heating interval, supplies a high-frequency output to at least two electrodes disposed on the workpieces, the high-frequency output being controlled with respect to a series of target values, the method comprising the steps of:

controlling the high-frequency output with reference to the series of target values that are dependent on a first parameter;

measuring a series of further parameter values during the heating interval; and effecting counteracting control of the high-frequency output responsive to the series of further parameter values supplied to a control circuit of the high frequency generator by temporarily increasing the output of the high frequency generator.

* * * * *